May 6, 1952  R. R. MUELLER  2,595,283
TOASTER AND THE LIKE
Filed Nov. 24, 1947  5 Sheets-Sheet 1

INVENTOR.
RUDOLPH ROBERT MUELLER

May 6, 1952
R. R. MUELLER
2,595,283
TOASTER AND THE LIKE
Filed Nov. 24, 1947
5 Sheets-Sheet 2
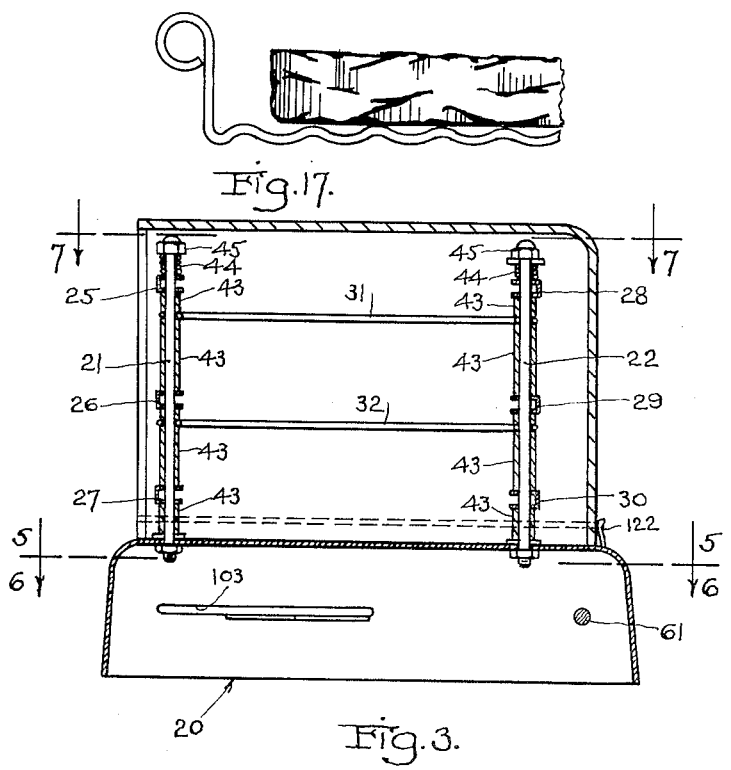
Fig. 17.
Fig. 3.
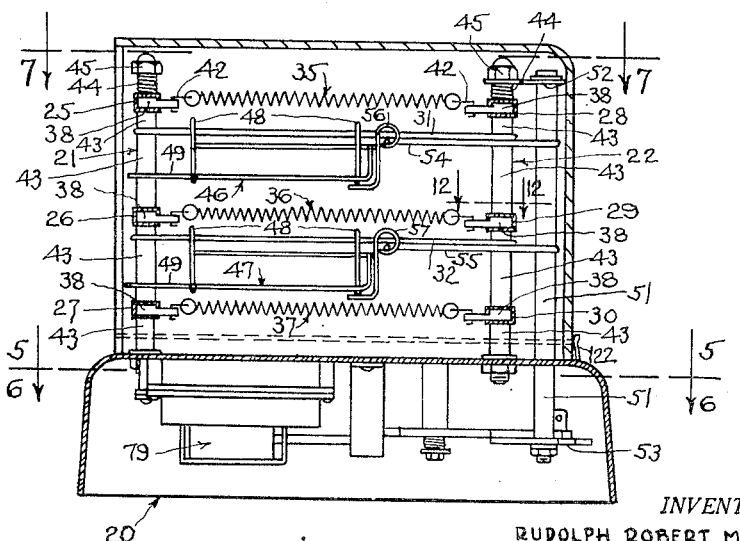
Fig. 4.
INVENTOR.
RUDOLPH ROBERT MUELLER

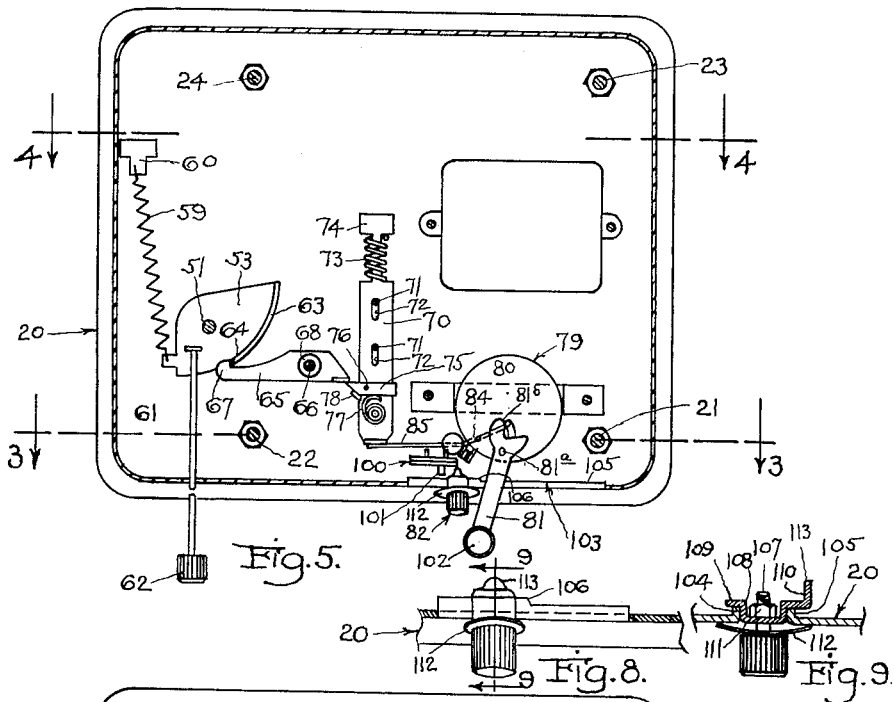
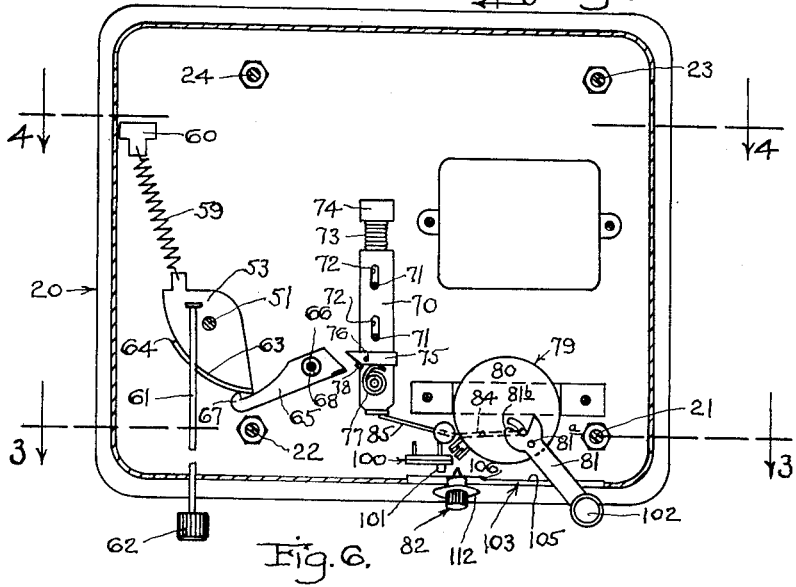

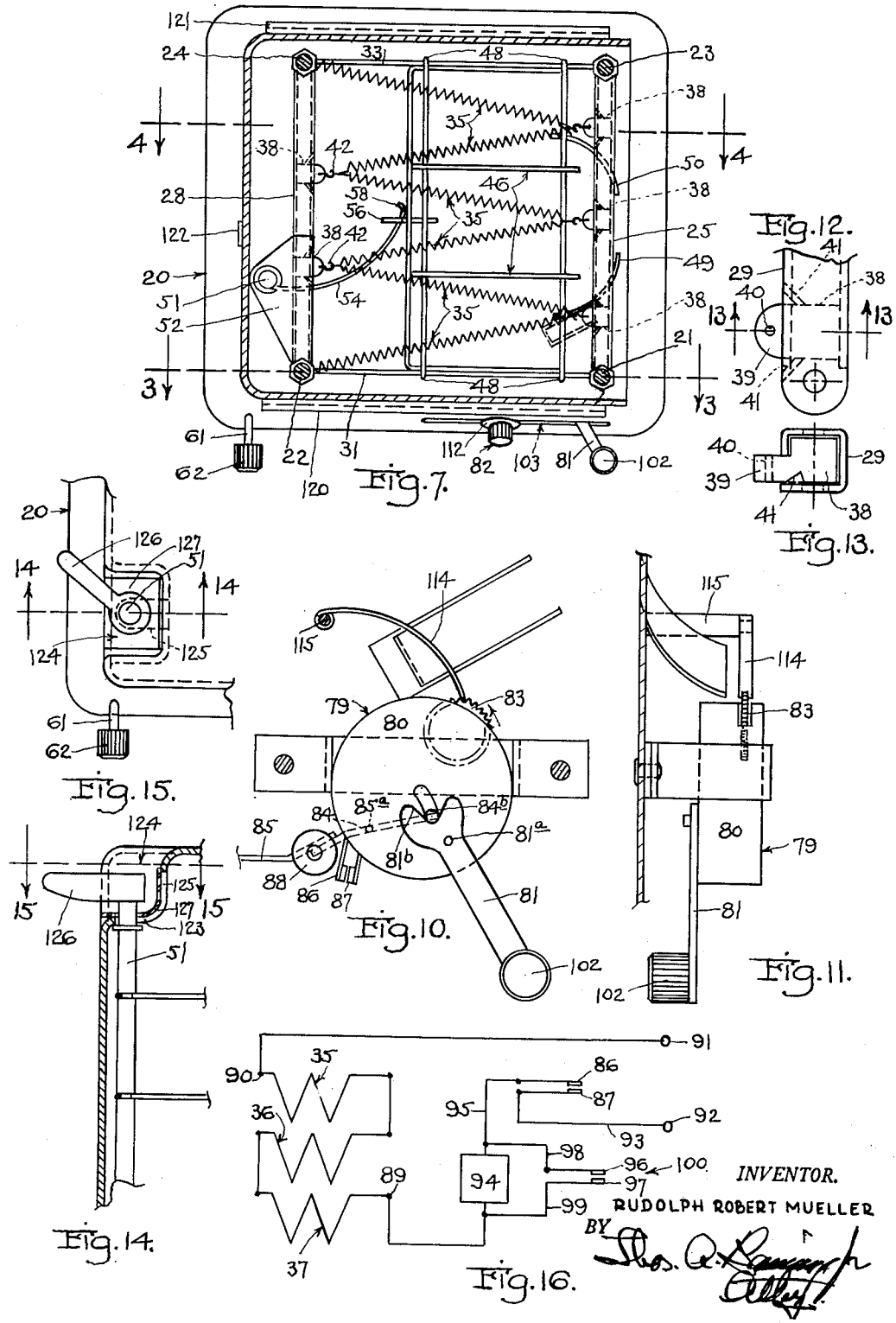

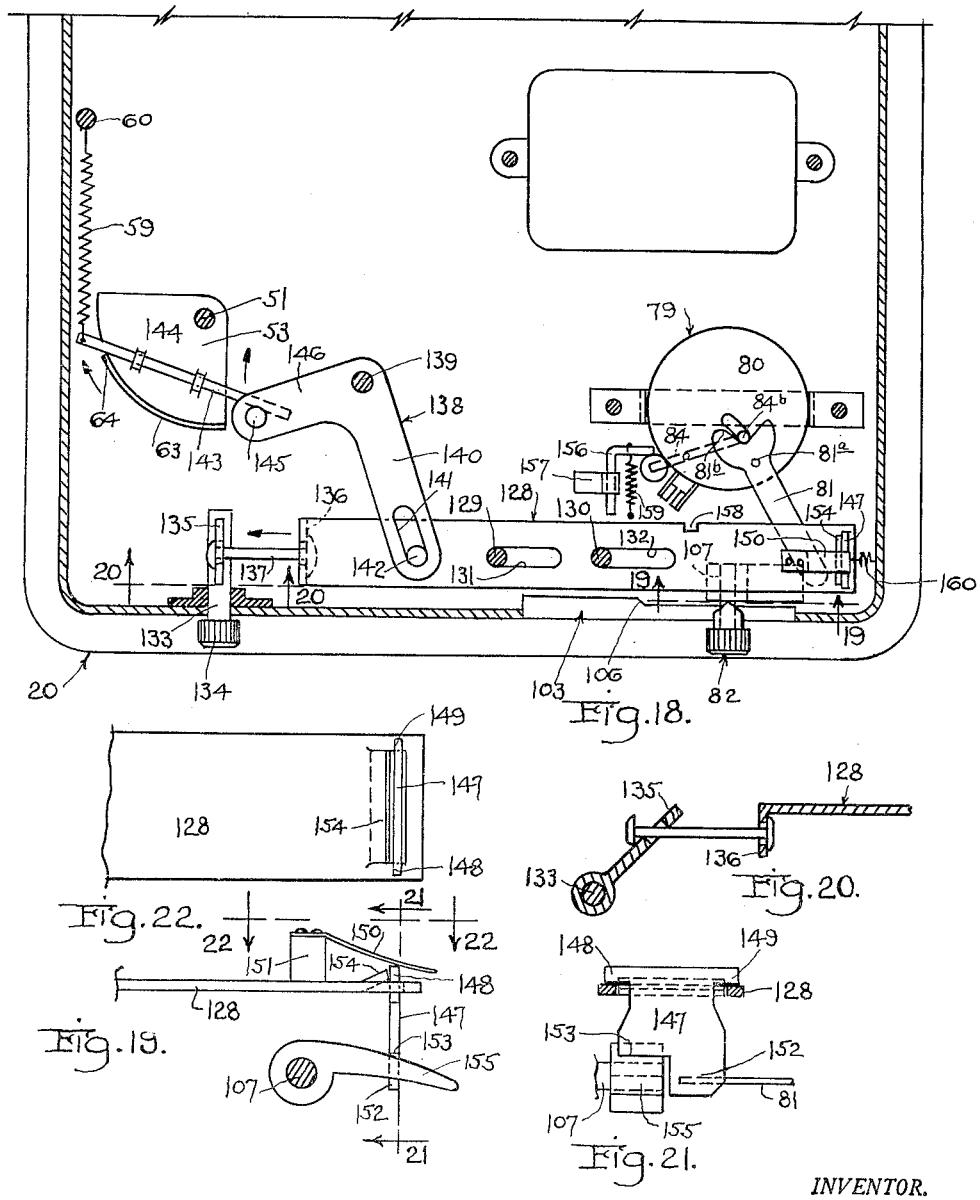

Patented May 6, 1952

2,595,283

UNITED STATES PATENT OFFICE 2,595,283

TOASTER AND THE LIKE

Rudolph R. Mueller, Marion, Ind.

Application November 24, 1947, Serial No. 787,652

3 Claims. (Cl. 219—19)

This invention relates to improvements in toasters, and the like. The toasters herein disclosed are intended for both household use and for commercial use, such as in restaurants and the like, and for other toaster uses. It will presently appear, however, that the toasters herein disclosed are especially well adapted for household use, and one embodiment of the invention designed to meet such use has been illustrated and will be described herein. In so doing, however, I wish it understood that I do not thereby intend to limit the use of the invention, nor the scope of the protection to be secured by me, except as I may limit myself in the claims.

One feature of the present invention relates to the provision of a toaster which is provided with horizontal cells for the accommodation of the slices of bread or other material which is being toasted. These cells are provided with or comprise suitable supports for the horizontally placed slices, such slices being thus held at exact positions within the toaster, and also being held in exact parallelism with respect to each other. By this means there is assurance that these several slices will always occupy exactly the same relative positions during the toasting operation, without the need of special care by the operator in placing the slices into the toaster. Furthermore, after the slices have been placed within these horizontal cells they cannot, during the entire toasting operation, move into other and unintended positions, so that there is assurance that the toasting operations will always be carried out under exact predetermined control, as respects slice positioning.

At this point I wish to point out that such horizontal cell positioning is radically differentiated from currently used arrangements in which the cells are vertically disposed so that the slices stand in substantially vertical position during the toasting operation. In such vertical cell arrangements it is necessary that the width of the cells be made sufficient to accommodate the widest slices which are currently used for such operations, and it is also necessary to provide such vertical cells with lateral supporting means for the slices to retain these slices against falling sidewise against and into contact with the lateral heating elements. Accordingly, whenever a slice is inserted it will not and cannot stand in exactly vertical position, unless perchance it is of exactly the full width of the cell, measured between such lateral supports. Accordingly each slice almost always leans to one side or the other within its cell, and as a consequence each slice almost invariably is toasted unevenly, more on one side than on the other side. Furthermore, with such vertical cell arrangement in which the lateral supports are provided for the slices, these lateral supports are generally formed of rather light and impermanent wire brackets or the like which readily become either bent or otherwise distorted or displaced from their intended positions. Such distortions or misplacements serve to greatly aggravate the tendency for the slices to be unevenly toasted on both sides, due to leaning of said slices from the exact verticalism which they should retain.

In connection with my provision of such horizontal cells for accommodation of the slices I have provided a horizontally movable slice carrier or tray for each slice. These carriers are suitably supported for horizontal reciprocating movement within the toaster, and through a distance sufficient to enable ready insertion and removal of the slices, and so that when the carriers are projected the toasted slices may be easily grasped and removed, and fresh slices may be set into place in or on such carriers; and so that when the carriers are retracted into the toaster they will carry the several slices back into full toasting position. I have provided simple but effective means to guide these carriers during such movements; generally such guiding means taking the form of rails or tracks within the toaster housing.

Conveniently these carriers comprise wire trays, since this construction will permit an almost completely open carrier without interference with ready and complete transmission of the heat of the heating elements to the faces of the slices. Furthermore such completely open carriers permit crumbs and the like which may break from the slices to fall down between the wires of such trays and be caught, either by a lower slice which is being toasted, or by a suitable receiver in the bottom of the housing, which I shall presently describe.

As a detail of construction, the supporting wires of these trays may be bent or corrugated in vertical planes so that the slices lying on the trays will be supported by the high points of such wires. In this manner the interference of the wires with transmission of heat to the bottom face of the slice will be minimized.

Another feature of my present invention concerns itself with the heating elements which are provided for heating the faces of the slices. Since these slices are supported in horizontal position I prefer to provide one heating element just above the position of the uppermost slice (if more than one slice carrier is provided), another heating element just below the position of the lowest slice, and other heating elements between the consecutive slices. These several heating elements are to be supported in correct positions with respect to the several slices carried by the carriers, so that uniform and equal toasting results will be secured on all slice faces. This requires that all the several elements, carriers and heating elements, shall be continuously held and retained in correct positions during the toasting operations. It is a further feature of my present invention that I have provided a very simple means to support and retain all these several parts.

In connection with the foregoing it is also desirable that all the parts just referred to shall be built and retained as a compact and readily assembled unit, of light parts and simple construction. It is also desirable that such support for these parts shall be so arranged that during the assembly of the several constituents, including the carrier rails, and the heating element supports, provision shall be made for exact and predetermined spacing of these parts so that when all are assembled the heating elements will be correctly spaced and held with respect to the several carriers. I have made such provision as will presently appear hereinafter.

A further and important feature of the present invention concerns itself with the means which I have provided for shifting the carriers back and forth. This means includes a curved or cam shaped element for each carrier, which curved or cam shaped elements are carried by a vertical rock shaft which is journalled in definite relation to the carrier rails and the heating element supports so that by rocking said shaft the engagements of these curved elements with the several carriers will ensure correct reciprocating movements of the carriers. In my co-pending application, Serial No. 744,090, filed April 26, 1947, I have shown a similar vertical rock shaft which is provided with similar curved elements or cams; but in that application these curved elements or cams act directly on the slices which are being toasted, whereas in the present case these curved elements or cams act on the carriers which in turn support the several slices.

A further feature of the present invention concerns itself with the means whereby this vertical rock shaft is rocked back and forth to shift the carriers back and forth. In that earlier application I have shown manual means to accomplish this result. In the present application I have made provision for effecting automatically timed rocking of this shaft in the ejection or delivery direction to thereby deliver the toasted slices (supported by the carriers) to ejected position after a predetermined timed interval. In connection with such automatic delivery after a timed interval of toasting I have provided manual means to draw the carriers with their supported slices back into retracted position to place them in correct toasting position and to commence the timing operation. These results I attain by rocking the shaft manually in the retracting direction, thereby retracting the carriers into the body of the toaster.

In connection with these functions, the setting of the timer may, in one embodiment of my invention, be accomplished as a separate function from the rocking of said shaft or in another embodiment of my invention the timer setting element may be interconnected with the rock shaft or related parts so that the setting of the timer will be performed as an incident automatically in connection with the functioning of the rock shaft and related parts.

A further feature of the present invention relates to means whereby the timing interval may be predetermined to thereby ensure the provision slices which have been toasted to a predetermined degree of darkness. This adjustment of the toasting time is effected by a readily adjustable element which may be pre-set to that degree of darkness of toast which it is desired to produce. When once that element has been pre-set it will retain such setting to ensure successive toasting operations to that predetermined degree of darkness until such element is changed to a different setting or adjustment.

In connection with the above mentioned features it is a further feature to provide switch means for automatically closing the electric circuit which supplies current to the heating elements when the operation is manually commenced. Devices for similar functions are well known at the present time, and have been extensively used. However, it is here noted that in such devices as heretofore provided and used the time count of the automatic timer commences immediately after the manual setting has been made. This is because in such time count devices as heretofore constructed and used the spring actuated time count mechanism has been released and commences to function immediately upon completion of the loading operation.

A time interval is required for bringing the heating elements up to toasting heat, and therefore, in such timing devices as heretofore provided and used the actual toasting interval has been less than the intended interval as shown by the setting of the timer; such deficiency being in each case that time interval required to bring the heating elements up to toasting temperature.

A further feature of my present invention, therefore, comprises the provision of thermostatic means to lock the timer against movement in the time count direction until the temperature of the toaster or some selected portion thereof has been raised sufficiently to ensure toasting operation, whereupon the time count element is released to permit it to begin its time count. By this means there is assurance that in each case the time count against each toasting cycle will be metered against that cycle only during a time interval during which the toasting temperature has been attained and retained.

A further and important feature of my present invention concerns itself with the provision of means whereby the toaster may be set for production of either "ordinary" toast, that is, toast which has been produced by application of a high radiant temperature so that the interior of the slice has not been dried out, only the superficial or outside faces of the slices being toasted; or for production of "melba" toast, that is, toast which has been produced by application of a lower radiant temperature so that a slower toasting operation is required. By this means the slice is dried out substantially, by application of the drying temperature for a sufficient time interval, and at the same time the superficial surface portions of the slice are toasted in well understood manner.

It will be seen that production of both of these forms of toast requires control of two functions, namely, both temperature and time. To produce the ordinary toast a shorter time interval is required than for melba toast, but a higher temperature must be used for the ordinary toast than for the melba toast. Accordingly a further and important feature of the present invention includes the provision for shifting from ordinary toast to melba toast, in the setting of the manual control element, such shift serving, when changing from ordinary toast to melba toast, to lower or reduce the temperature which will be attained by the heating elements. Thus, as long as the melba toast setting is retained the temperature of the heating elements will be at that lower degree which is required for production of such special toast; and when ordinary toast is to be produced the heating element temperature will be higher than that for melba toast by an amount required for the production of such ordinary toast. In connection with such changeover of heating element temperature I have also provided for time control, so that when producing ordinary toast, for example, the time function can be adjusted to that interval required for production of, for example, light, medium, or dark toast, but in each case with use of the necessary high heating element temperature. Or, again, when making melba toast the time function may be changed while using the lower temperature setting of such melba toast function.

Specifically, I have made provision for changing the current value used in the heating elements when changing from ordinary to melba toast setting, reducing the current when producing melba toast as compared with the current used when producing ordinary toast, and vice versa.

Another feature of the present invention relates to the provision of a crumb tray removably located in the lower portion of the housing. This tray is so located that crumbs which drop down during the toasting operations will be caught by this tray, so that by removal of the tray all such crumbs are carried out from the housing and be readily disposed of. In this connection a further feature of the invention relates to the provision of completely open heating elements in the form of wire elements through which such crumbs may readily fall, passing on down to such tray in the lower portion of the housing, or on to a lower slice being toasted. In any case, however, the provision of such fully open heating elements, together with the tray in the lower portion of the housing, will ensure greatly increased cleanliness of the toaster as a whole, and will make it possible to dispose of such crumbs in a cleanly manner.

At completion of a toasting cycle the slice carriers stand in their projected position, so that the toasted slices may be removed, and also the timer has completed its time count operation. Therefore, to institute a new or succeeding toasting operation two functions must be performed; the slice carriers must be retracted into the body of the toaster to that position where the heating elements will properly act on the slices, and also the timer must be loaded or set to its commencing position so that a new time count may be instituted. In the present application I have illustrated two forms or embodiments; one in which these two functions are performed separately by two manual settings, and the other being an embodiment in which the necessary parts are interconnected so that manipulation of a single manual element, such as a knob, will simultaneously retract the slice carriers into toasting position and cock or set the related parts, and at the same time the timer will be moved to its time count beginning position. By this combined form of control the operator need manipulate only this single control element.

In connection with the foregoing I have also so arranged the parts that such interconnection feature will operate with equal effectiveness no matter what time interval of count may be desired. That is, with the time interval knob set to a given setting, for example, medium toast of the "ordinary" kind, this interconnection will operate correctly to ensure setting of all parts to the proper positions to institute the toasting operation, and this will also be true for other settings of the time interval knob, such, for example, as settings thereof in the "melba" toast range of operations.

Other objects and uses of the invention will appear from a detailed description of the same, which consists in the features of construction and combinations of parts hereinafter described and claimed.

In the drawings:

Figure 3 shows a vertical section taken substantially on the line 3—3 of Figures 1, 5, 6 and 7, looking in the directions of the arrows, and this figure shows the manner in which the various elements are assembled on the horizontal posts;

Figure 4 shows a vertical section taken substantially on the line 4—4 of Figures 1, 5, 6 and 7, looking in the direction of the arrows, and it shows the slice trays or carriers and some of the operating elements which are contained in the base section of the toaster;

Figure 5 shows a horizontal section taken substantially on the line 5—5 of Figures 1, 2, 3 and 4, looking in the direction of the arrows, and this figure shows the principal operation parts in their "set" position, that is, substantially at the beginning of the timing operation;

Figure 6 shows a horizontal section taken substantially on the line 6—6 of Figures 1, 2, 3 and 4, looking in the direction of the arrows, and this figure shows the principal operating parts in their final or released or trip-off position, that is, at the completion of the toasting operation;

Figure 1:
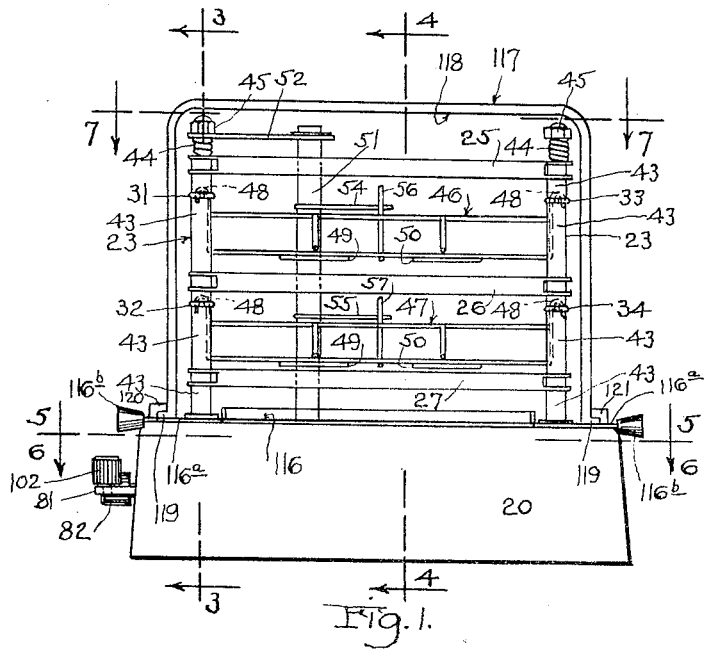
Figure 1 shows a front elevation of a two slice toaster embodying the features of my present invention.
Figure 2:
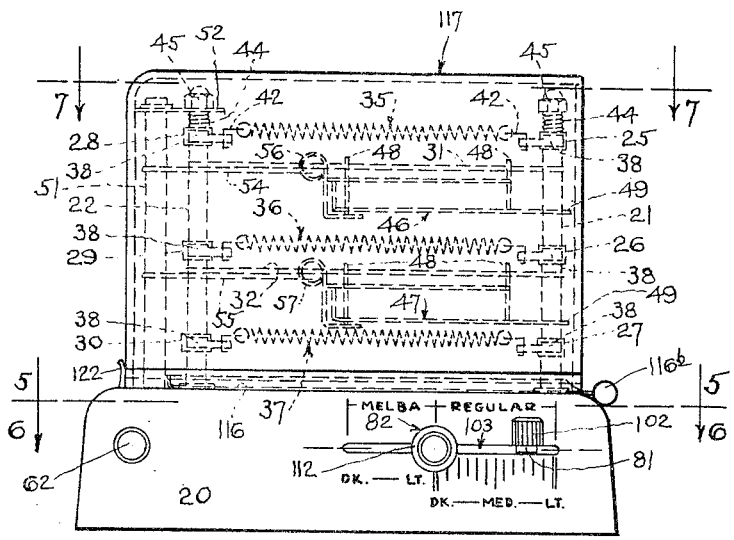
Figure 2 shows a side elevation corresponding to Figure 1, looking at the left or operating side of the toaster, the setting button being placed in its more or less central position.

Figure 7 shows a horizontal section taken substantially on the line 7—7 of Figures 1, 2, 3 and 4, looking in the direction of the arrows, and this figure shows the general plan form of the slice carriers, and the arrangement of the curved arms or cams therewith, the parts being in their projected or slice delivery position at completion of a toasting operation, being also their position when fresh slices are to be set onto the carriers preparatory to another toasting operation;

Figure 8 shows a fragmentary horizontal section on enlarged scale, taken substantially on the line 8—8 of Figure 2, looking in the direction of the arrows;

Figure 9 shows a fragmentary vertical section taken on the line 9—9 of Figure 8, looking in the direction of the arrows;

Figure 10 shows an enlarged horizontal or plan view of the timer element, together with the thermostatic unit which controls release of the time-count when the temperature of the toaster reaches a sufficient degree;

Figure 11 shows a side elevation corresponding to the showing of Figure 10;

Figure 12 shows a fragmentary horizontal section taken on the line 12—12 of Figure 4, looking in the direction of the arrows; and this figure shows the end portion of one of the lateral holders for the heating element;

Figure 13 shows a cross-section taken on the line 13—13 of Figure 12, looking in the direction of the arrows;

Figure 14 shows a fragmentary vertical section at the position of the rock-shaft, and it shows a modified form of construction in which the setting of this rock shaft at the beginning of the time count operation is effected by a finger located at the top of the toaster;

Figure 15 shows a fragmentary horizontal section taken on the line 15—15 of Figure 14, looking in the direction of the arrows;

Figure 16 shows a simple wiring diagram of connections enabling the use of the heating elements for production of either "ordinary" or "melba" toast by a simple switch control;

Figure 17 shows a modified form of the supporting wires of the slice carrier trays, in which said wires are corrugated to provide numerous small points of slice support;

Figure 18 shows in more or less schematic form the rock shaft which controls reciprocating movements of the slice carriers, the timer, and an interconnection between all these parts whereby manipulation of a single control button will serve to set or retract the slice carriers into the toasting position, and will also set or load the timer to the pre-determined position so that said timer will function to the intended time interval, the parts in this figure being shown in their position at completion of a toasting operation;

Figure 19 shows a fragmentary section on the line 19—19 of Figure 18, looking in the direction of the arrows;

Figure 20 shows a fragmentary section taken on the line 20—20 of Figure 18, looking in the direction of the arrows;

Figure 21 shows a fragmentary section taken on the line 21—21 of Figure 19, looking in the direction of the arrows; and Figure 22 shows a fragmentary plan section taken on the line 22—22 of Figure 19, looking in the direction of the arrows.

In the drawings I have shown one embodiment of my present invention which includes a housing. This housing is carried by a suitable base section; and in the embodiment shown this housing is made of transparent material so that at all times the toasting operations may be observed. Such a transparent housing arrangement is disclosed in my aforesaid copending application, Serial No. 744,090, and per se it does not constitute any portion of the present application. Furthermore, insofar as concerns the general features of the present invention they may be embodied in a structure which includes either a transparent or an opaque housing, or no housing at all for that matter in some cases. Therefore I do not intend to limit myself in the present application to such transparent housing or to any form of housing, except as I may do in the claims to follow.

Conveniently I provide a base section 20, which is hollow and may be formed of sheet metal or may comprise a casting of light metal such as aluminum. Various of the operating parts, including the timer, are conveniently located within this hollow base, as will be presently explained.

Carried by the top or roof of this base section is a frame comprising the four corner posts 21, 22, 23 and 24. The front of the toaster shown in the drawings lies between the posts 21 and 23, the back being between the posts 22 and 24. Extending between the posts 21 and 23 there is a series of bars 25, 26 and 27, and extending between the posts 22 and 24 there is another series of bars 28, 29 and 30. These six bars are conveniently of channel cross-section, as shown in several of the figures, but generally speaking such section form is optional. These six bars provide, however, lateral connections between the several vertical frame posts referred to, and the details of the construction in this regard will be described presently.

Extending between the posts 21 and 22 are the bars 31 and 32, and extending between the posts 23 and 24 are the bars 33 and 34. These four bars provide fore and aft connections between the several posts referred to. Thus the frame comprises the four corner posts, together with six crosswise extending frame bars (three at front and three at back) and four front to back frame bars (two at each side of the frame). The bars 31, 32, 33 and 34 conveniently comprise stiff wire rods providing rails for the slice carriers presently to be described.

Each of the channel shaped elements or bars 25, 26, 27, 28, 29 and 30 serves as a support for means to retain and support the heating elements. These heating elements are conveniently formed of spiral lengths of suitable resistance wire, as shown at 35, 36 and 37. Each heating element comprises a length of such spirally formed resistance wire, such heating element extending in zig-zag fashion back and forth between insulating supports carried by the channel shaped bars just enumerated. Such supports are shown in the form of insulating elements such as that shown at 38 in Figures 12 and 13. These insulating elements are set into the open face of the channel in which they are located, each insulating element being provided with a lug 39 which extends through the open face of the channel, and to which lug the heating element wire may be connected, or through which lug such wire may be passed, the lug being provided with an opening 40 for such purpose. It will be seen from Figures 7 and 12 in particular that these insulating supports only occupy a portion of the lengths of the channels in which they are located. In order to locate and retain the several insulating supports in correct positions in the channels, said channels are provided with ears or lugs 41 which are struck from one of the channel faces into positions at both sides of the insulating supports. In case of breakage of any support or need for replacement thereof, these ears may be easily bent into flat condition thus enabling the one insulating support to be slid out from the channel, and the new support to be slid into place, the channel having previously been removed from the posts whereby it is carried.

If desired the attachment of the heating element wire to each insulating support may be effected by use of a small hook like retainer such as shown at 42 in Figure 7. Preferably such hooks lie in horizontal planes so that the apex convolution of the spiral resistance wire may be engaged with the hook without having to twist or distort the spiral of the heating element at the position of such connection.

The various heating elements may be electrically connected up in any desired manner, but generally these several heating elements will be connected in series with each other, thus providing a simple electrical circuit.

A desirable means of assembly of the various channel shaped bars and the stiff wire bars or connectors, to the vertical posts is that shown in Figures 3 and 4 in particular. By examination of those figures it will be seen that I have provided sleeves such as 43 which are slipped over the posts, and which sleeves serve to correctly space the various channel bars and the wires on the posts, and also serve to retain all the channel shaped bars at such spacing as is correct to ensure that the various heating elements will be correctly spaced from each other. Preferably a small spring 44 is located at the upper end of each post and presses against the uppermost one of such sleeves, such spring being then compressed by an acorn nut 45 threaded down onto the upper end of such post and locking the several elements and sleeves onto the post and under spring compression.

The foregoing type of construction and assembly presents various practical advantages. Included in these is the fact that by proper selection of the lengths of the several sleeves the heating elements may be retained at exactly that spacing which will give the correct amount of heat transmission to the upper and lower faces of the adjacent slices. Thus, if it is found that the toasting of these faces is not correctly balanced, it is possible to substitute sleeves which will give a slightly different spacing of the heating elements in question, thus making it possible to secure the desired equality of toasting action.

In connection with the foregoing production of equal heating effects, it is to be noted that the toasting action is produced not only by the heat directly radiated to each slice face from the adjacent heating element, but is also dependent on the action of reflected heat from surrounding objects. This reflected heat is principally that from the interior faces of the housing. It will be seen that the toasting action on the upper face of the top slice will be greatly affected by radiant heat from the inside face of the top of the housing; and that the toasting action on the lower face of the bottom slice will be greatly affected by radiant heat from the inside face of the bottom of the housing, that is, from the top of the base section 20. Therefore, while it is possible to substantially predetermine these heating effects, the herein disclosed means for so supporting the several heating elements that they may be adjusted (in the original assembly) to exact desired positions makes it possible to produce a toaster for two or more slices with assurance that all slice faces will be evenly and uniformly toasted. It is noted that the toasting actions on the adjacent faces of the slices will be produced primarily by the intermediate heating element or elements, and that such intermediate heating elements should therefore be so designed as to produce a greater heating effect than the top and bottom heating elements. Such result may be ensured by correct selection of the size of wires used in the several heating elements, and also by the lengths of the wires coiled into the heating elements in question.

The toaster illustrated in the drawings is for simultaneously toasting two slices. Accordingly it is provided with two slice carriers shown at 46 and 47 in Figures 1, 2 and 4. These carriers are conveniently formed of wires bent into proper form and interlocked; and each carrier is provided with lateral eyelets or hooks 48 which ride on the wire rails 31—33 or 32—34, as the case may be. Each carrier preferably is provided with side slice supports and a back slice support as will be readily apparent from Figures 1, 2, and 4. Thus the slice may be readily set into the carrier from the front of the toaster through the housing opening to be presently described; and such slice may be set clear back against the back of the carrier, thus exactly locating such slice on its carrier. Preferably these carriers are somewhat shorter (front to back) then the length of the slice to be supported thereon, and then the bottom portion of the carrier is provided with a forwardly extending projection in the form of the curved wires 49 and 50 (see Figure 7), such projection serving to give support to the overhanging portion of the slice, and at the same time making it possible to form the body of the carrier of less length (front to back) than the full length of the slice. The advantages of this arrangement will be readily appreciated when Figure 7 is examined in which it is seen that by this means the side portions of the carrier terminate well back of the extreme forward dimension of these curved wires 49 and 50. This also makes it possible to set the forward posts 21 and 23 further back than would otherwise be required, since the wire rails on which the carriers travel can thus be stopped farther back than would otherwise be necessary.

The foregoing carrier arrangement is one in which the forward projection of the carriers serves to ensure projection of the front portions of the slices an amount sufficient to enable the slices to readily be grasped between the thumb and forefinger for removal of the toasted slice. This does not require projection of more than the curved wire portions 49 and 50 through the housing opening, leaving the body portions of the carriers well within the housing proper. Furthermore, by suddenly projecting the carriers from their extreme retracted positions, when the toasting operation has been completed, the slices may and generally will be thrown somewhat ahead of the forward limit of movement of the carriers, by a momentum action, the forward movement of the carriers being effected suddenly by spring action, and being limited suddenly by a suitable stop. As a result the slices will generally be actually thrown somewhat ahead of the stopping position of the carriers, so that an even greater degree of slice projection will be effected than would be expected from the final position of the carriers themselves.

Also, with the wire extensions projected through the housing opening fresh slices may be readily set into place on the carriers when the latter are in their forward positions.

The back and forth movements of the carriers must be accomplished. For this purpose I have provided the means which I shall now explain in detail:

Adjacent to the rearward limit of carrier movement there is provided the vertical rock shaft 51. This shaft is conveniently journalled at its upper end in a triangular plate 52 which is supported by the upper portions of the posts 22 and 24. This shaft extends through a journalled opening in the top of the base section 20, and thus reaches into the space within said base section. To the lower end of this rock shaft there is connected the plate 53, well shown in Figures 5 and 6. This plate 53 therefore rocks back and forth with the shaft. The shaft carries the curved stiff wire elements or cams 54 and 55 which are well shown in Figures 2, 4 and 7. The rear or back portions of the carriers are provided with loops or fingers 56 and 57 which are engaged by the curved wire elements 54 and 55; and preferably also the extreme end portions of these wire elements 54 and 55 are hooked as shown at 58 in Figure 7 to prevent disengagement of the parts. As a result the rocking movements of the shaft are communicated to the carriers in the form of back and forth movements of the carriers. The rocking movement of the shaft required for this operation is about 90 degrees, as will be evident from comparison of Figures 5 and 6.

A spring 59 has one end connected to the plate 53 and its other end connected to a lug 60 projecting down from the bottom of the top of the base section 20. This spring is strong enough to rock the plate and shaft fully clockwise when viewed from above, thus also rocking the curved wire elements 54 and 55 clockwise and forcing the carriers forwardly or in the delivery direction. A pull rod 61 has its inner end connected to the plate 53, said rod extending out through an opening in the side wall of the base section 20 and being provided with a button 62. The curved edge of the plate 53 is provided with an upturned flange 63 of which the left hand edge 64 forms a shoulder which can be engaged by a suitable hook. This hook is in the form of a trip finger 65 pivoted to the bottom face of the top of the base section 20 at the point 66; and the free end of this trip finger is provided with a hook 67 which may engage the shoulder 64 of the flange 63 when the rock shaft is rocked counterclockwise to a sufficient extent. A light spring 68 is provided on the pivotal support 66, serving to rock the finger 65 is the hook engaging position. With this arrangement, by pulling out the button 62 sufficiently the plate 53 and rock shaft will be rotated to a point where the hook 67 will engage the shoulder 64, thus locking the parts in the fully rocked position in the counterclockwise direction. At the same time the spring will be extended and placed under full tension. This rocking movement serves to also retract the carriers fully into the housing and into toasting position, and the carriers are then locked in such retracted position during the toasting interval.

Since the spring 59 was fully extended during the retracting operation just described it follows that when the hook 67 is subsequently released from the shoulder 64 the spring will suddenly rock the shaft 51 in the clockwise direction, thus suddenly projecting the carriers in the delivery direction. This delivery movement may be suddenly arrested by suitable means. The sudden impact thus provided will assist in projecting the toasted slices slightly forwardly beyond the stopped positions of the carriers, according to the feature already mentioned. The tension of the spring 59 may be adjusted as a control factor in order to predetermine the velocity of projection of the carriers when released after completion of the toasting cycle. This will make it possible to predetermine the impact at stoppage of the carriers when they are projected forwardly and therefore to control the extent to which the toasted slices will be projected forward beyond the stopped position of the carriers.

Within the base section 20 there is slidably mounted the plate or bar 70 (see Figures 5 and 6). This plate may be carried by the pins 71 extending down from the top of the base section, and extending through the slots 72 formed in said plate. A spring 73 has one end pressing against this plate and its other end engaging the lug 74 which is also carried by the top of the base section, said spring normally projecting the plate 70 towards the left hand side of the toaster, until limited by the engagement of the end of such slots with the pins. This plate carries a trigger 75 which is pivoted to the plate at the point 76, a spring 77 serving to normally hold the trigger against a lug 78 carried by the plate 70 as shown in Figures 5 and 6. With this arrangement, when the plate 70 is forced towards the right in the base section (away from the observer when viewing Figures 5 and 6), the trigger 75 will engage the heel of the hook element 65, rocking it counterclockwise, and disengaging it from the shoulder 64. This will release the rock shaft so that the spring 59 will project the carriers in the delivery direction, placing the parts in the position shown in Figure 6. During this action the trigger may ride past the heel of the hook 65; then, due to the pivoting of the trigger on its pivot 76 the plate 70 may be returned to its original or left hand position (see Figure 5) prior to return of the hook to the position of Figure 5. In other words, this arrangement makes it possible for the plate and trigger to be returned to their original positions prior to return of the hook 65 to its position shown in Figure 5. The desirability of this function will soon become evident.

There is a timer element designated in its entirety by the numeral 79, located within the base section 20. This timer element may be of any suitable construction, but that shown is capable of correctly functioning for the present purposes. This illustrated timer is what is known as a "Rhodes" timer. It includes a housing 80 within which is a spring element (not illustrated), which spring element may be placed under tension or force by rocking an arm 81 towards the left in Figure 10. When released thereafter this spring element will cause the arm 81 to slowly rock towards the right under uniform rate of release, as by control of an escapement (not shown), so that after lapse of a time interval this arm 81 will again reach its extreme right hand position or limit of movement. Thus, by providing an adjustable stop to limit or position the extreme left hand original setting of this arm 81 the time interval which will elapse during movement of said arm to its extreme right hand position or limit will depend on how far to the left said arm was originally set against such adjustable stop. Such stop is shown in Figures 1, 2, 5 and 6 at 82. It will be further described in full detail.

This timer includes a gear train of which the gear 83 (Figure 10) constitutes one element. Releasing movement of the spring within the timer (accompanied by rightward movement of the arm 81) is accompanied by rotation of this gear 83 in the direction shown by the arrow in Figure 10. This timer also includes an outwardly projecting arm 84 to which an extension 85 is attached as shown in Figure 10. The construction of the timer is such that when the arm 81 reaches its full or extreme right hand limit of movement (at completion of the timed interval) this arm 84—85 is released and allowed to spring suddenly clockwise; and when the arm 81 is intentionally and manually moved towards the left for instituting a new toasting operation the arm 84—85 is rocked in counterclockwise direction and is cocked or locked in such position while the arm 81 is being moved to its full leftward movement, and said arm 84—85 remains in such locked condition until the arm 81 again reaches the right hand extreme of its movement whereupon said arm 84—85 is quickly released and rocks, under spring force, in clockwise direction, as previously explained.

The details of such arrangement of timer shown in Figure 10 include the following:

The arm 84—85 is pivoted at the point 85ª and the spring effect of the contact leaf 86, presently to be described, acting against the roller 88 carried by said leaf contact is sufficient to rock the arm 84—85 clockwise when said arm is released for such movement. The arm 81 is pivoted at the point 81ª. The inner end of this arm is provided with a cam surface or edge 81ᵇ which will be engaged by a pin 84ᵇ carried by the inner end of the arm 85. The form of this cam is such that the following operations are produced:

When the arm 81 is moved to any position leftward of its full right hand position the cam 81ᵇ will force the pin 84ᵇ away from the pivotal point 81ª thus quickly rocking the arm 84—85 counterclockwise and forcing the roller 88 to press the contact arm 86 against the contact arm 87. This will close the circuit immediately after the beginning of the leftward movement of the arm 81. Any further leftward movement of said arm will occur with these contacts in closed position, the form of the cam on the end of the arm 81 making this possible and ensuring this result. However, when the arm 81 again attains its extreme right hand limit of travel the pin 84ᵇ will again ride down over the cam edge 81ᵇ and allow the contact 86 to force the arm 84—85 clockwise to open the circuit. The effect of the foregoing is that the heating element circuit is closed at all times while the arm 81 is away from the extreme right hand position of said arm, that is, to the left of such extreme right hand position. Such right hand extreme position is the cycle terminus position.

It is thus evident that when the arm 81 has been set over to the left a distance corresponding to the intended time interval, the arm 84—85 is cocked in its counterclockwise set position and remains in such cocked position until the arm 81 reaches its extreme and final right hand limit of movement; and that when such extreme right hand limit of movement of the arm 81 is attained the arm 84—85 is suddenly released and snaps in clockwise direction of rock.

This timer also includes the two contact leaves 86 and 87 which lie close to the cocked position of the arm 84—85. These contacts are normally separated, but when the arm 84—85 is cocked in its counterclockwise moved position these contacts are forced together, as shown in Figure 10. This result is produced by engagement of a small insulating roller 88, carried by the arm 84, with the contact 86, thus pressing said contact 86 against the contact 87. It is thus seen that when the parts are cocked by movement of the arm 81 towards the left, the contacts are also brought into engagement with each other, and that when the extreme or final right hand limit of movement is reached by the arm 81 (corresponding to completion of the timed interval, and release of the arm 84—85) these contacts are also disengaged from each other opening a circuit.

The arm 85 is also shown in Figures 5 and 6. From those figures it is seen that when the arm 84—85 is cocked into the position of Figure 5 the arm 85 is drawn towards the observer, thus permitting the plate 70 to be moved under force of the spring 73 to its forward or initial position, and allowing the trigger 75 to engage behind the tail of the hook 65. This condition will obtain as long as such arm 84—85 remains cocked. Then when the timed interval is completed and the arm 81 has reached its right hand extreme of movement, the arm 84—85 is released and springs in clockwise direction, thus forcing the plate 70 inwardly against the spring 73 and causing the trigger 75 to rock the hook 65. This will disengage said hook 65 from the shoulder 64 and release the plate 53, allowing the spring 59 to rock said plate and also the rock shaft 51. This will quickly rock the curved arms 54 and 55 clockwise, thus forcing the slice carriers outwardly to discharge them and complete the toasting operation. At the same time the contacts 86 and 87 will separate thus opening their circuit.

When fresh slices have been placed in the carriers, the button 62 may be pulled towards the observer, thus latching the shoulder 64 of the plate 53 onto the hook, and at the same time the shaft 51 will be rocked counterclockwise, thus drawing the slice carriers back into their toasting positions with their supported slices. It is to be noted that up to this point the timer has not been set into operation to time toasting of these freshly introduced slices, nor has the circuit has been again closed by engagement of the contacts 86 and 87 with each other. These functions are produced as follows:

After pulling out the button 62 and bringing the parts controlled thereby into latched position, the arm 81 will be forced leftward against the button 82 to institute the timing operation under that time limit dictated by the position of that button 82. This operation of rocking the arm 81 leftwardly will, as already explained, rock the arm 84—85 counterclockwise, thus allowing the plate 70 to be moved under the force of the spring 73 from the position of Figure 6 to that of Figure 5. This will carry the trigger 75 with the plate, and it will be necessary for that trigger to ride past the heel of the hook 65. Such action is permitted by reason of the fact that the trigger is pivoted on the point 66, and as the trigger rides past the heel of the hook, the trigger will rock clockwise against the force of the light spring 68, which spring will snap the trigger back against the stop 78 after the heel of the hook has been cleared.

The counterclockwise rocking of the arm 84—85 will also bring the contacts 86 and 87 together to close the circuit which they control. That circuit is the circuit of the heating elements, and reference may be had to Figure 16 as illustrative of one simple form of such heating element circuit. The heating elements are also shown in Figures 2, 4 and 7, in which figures the three heating elements are shown at 35, 36 and 37, for the upper, central, and lower heating elements respectively. Conveniently these three heating elements are connected in series as shown by the wiring diagram of Figure 16, the terminals 89 and 90 constituting the terminals of this series. The plug-in terminals of the toaster are shown at 91 and 92. The contacts 86 and 87 are also shown in this figure. The heating element terminal 90 connects directly to the toaster terminal 91; the contact 87 connects to the toaster terminal 92 by the lead 93. The contact 86 is to be connected to the heating element terminal 89 either directly or through a resistor as will be presently explained. This resistor is shown schematically at 94. The heating element terminal 89 connects to one side of this resistor, and the contact 86 connects to the other side of the resistor by the lead 95. With this so-far described arrangement it will be seen that when the switch contacts 86 and 87 are closed together the heating elements in series with each other are placed across the line or toaster terminals 91 and 92, but with the resistor 94 included in the series. Under these circumstances the magnitude of the current allowed to flow through the heating elements will be reduced by the presence of the resistor in the circuit, so that the temperature which will be attained by the heating elements will be accordingly reduced. This condition is for the production of "melba toast," as will presently appear.

I have also provided a switch including the contacts 96 and 97; and the contact 96 is connected to the lead 95 by the lead 98, and the contact 97 is connected to the lead 89 by the lead 99. Accordingly when the contacts 96 and 97 are brought together by closing of their switch (designated in its entirety by the numeral 100), the resistor is short-circuited, and is cut out of the series, and the current permitted to flow through the heating element series is accordingly increased. This will cause the heating elements to assume a higher temperature, for production of "ordinary" or "regular" toast. Conveniently the switch 100, which is shown more or less schematically in Figures 5 and 6, may be a snap switch of what is known as the toggle type, and in Figures 5 and 6 the small toggle finger of this switch is shown at 101. When this toggle finger is shifted to the left from the position shown in those figures this switch is opened so that the resistor is cut into the circuit, whereas when the toggle finger is restored to its position as shown in those figures the switch is closed so that the resistor is cut out of the circuit. It is to be noted that this toggle finger will remain in either its open circuit or its closed circuit position until purposely shifted to its other position. It is also now evident that with the toggle finger 101 in the position shown in Figures 5 and 6 the resistor is short circuited and thus the heating elements are placed directly across the line terminals 91 and 92, and the maximum degree of heat is produced for corresponding production of "ordinary" or "regularly" toast. Also, that by rocking the finger 101 to the left from its illustrated position the resistor is cut into the series with the heating elements, imposing its additional resistance into the circuit, and reducing the current flow, and thus causing the heating elements to produce a lower temperature for the production of "melba" toast.

It is noted that when the button 82 is moved from the position of Figures 5 and 6 leftward it will engage the toggle 101 of the switch to throw said switch during the first small amount of such leftward movement of the button 82. The toggle switch and/or the button are so constructed that these parts may yield slightly to permit the button to be moved further to the left, leaving the switch in its thrown position. For example, the toggle lever 101 of the switch may recede slightly into the switch housing to permit such yielding action, and then, as the button is moved further to the left the toggle lever 101 will again snap out into such position that when the button 82 is again moved to the right past the switch, the button 82 will engage the toggle lever 101 on its left hand face and throw the switch back to the right and into its original position. In other words, when the button is moved from the "ordinary" toast range (to the right of the switch 100) and to the "melba" toast range (to the left of the switch 100) said switch will be thrown to the open circuit position and will remain in such open circuit position as long as the button 82 is in the "melba" toast range; whereas when the button 82 is moved from the "melba" toast range and into the "ordinary" toast range said switch 100 is closed and remains closed as long as the button 82 is in the "ordinary" toast range.

The button 82 has been previously referred to. This button and its functions will now be described more in detail, as follows:

Conveniently the arm 81 reaches through a slot 103 in the side wall of the base section, and a button 102 may be provided on the projecting end of this arm 81.

The button 82 and adjacent parts are shown in detail in Figures 8 and 9, to which reference may now be made. The slot 103 is formed with the upper and lower inwardly projecting flanges 104 and 105 formed from the sheet metal of the base section itself; and these flanges are so cut that shoulders 106 are provided in the midportion of the slot. The button 82 is carried by a pin 107, which pin may be made rigid with respect to the button so that rotation of the button also rotates the pin. There is provided a metal clip 108 which is adapted to ride along the slot, this clip having the upper and lower flanges 109 and 110 which extend through the slot and ride on the flanges 105 and 104 so that the clip is guided in its longitudinal movements along the slot; and a nut 111 is threaded onto the inner portion of the pin. Between the button 82 and the outer face of the wall of the base section there is placed a disk shaped somewhat springy washer 112 which will ride over the outer face of the base section as the button and pin are moved back and forth along the slot.

With the foregoing arrangement it is seen that when the button and pin are located in that portion of the slot lying to the right of the shoulders 106, the button may and should be threaded sufficiently by rotating it to draw the nut and the clip close to the button itself, the relatively narrow flanges to the right of the shoulders making this possible. Then, as long as the adjustments of the button and pin are made in that zone or location to the right of the shoulders, the button and pin, and clip may be moved back and forth without having to exert much pressure laterally against the button, the springy nature of the disk 112 permitting such movements to be made while still ensuring that the parts will remain in a given or set position. This zone to the right of the shoulders may be called the zone for preparation of "ordinary" or "regular" toast. As long as the button remains in its set condition of threading on the pin 107 it will also be seen that movement to the left will be arrested by engagement of the clip against such shoulders. The zone to the left of these shoulders may be called the "Melba" toast zone, and as long as the button and clip travel in that zone the toaster will be placed in condition for production of "Melba" toast. In order, however, to shift the button and clip into this "Melba" toast zone it is necessary for the operator to purposely turn the button, threading the pin out through the nut a distance sufficient to provide an additional distance between the button and the nut, sufficient to enable the clip to ride up and onto the deeper flange portions. This operation requires the clip to move over the shoulder; and to facilitate this movement these shoulders are preferably made with slanting approaches, as well shown in Figure 8. Nevertheless, until the nut and pin have been thus threaded far enough to provide the required additional amount of clearance it will be impossible to force the button leftward past the location of the shoulder. Upon shifting the button and pin rightwardly from the "Melba" toast zone to the "ordinary" toast zone the button should be again threaded in reverse direction to draw the nut along the pin to a position closer to the button so that operation in the "ordinary" toast zone will not be inadvertently extended over into the "Melba" toast zone.

The outer face of the wall of the base section may be provided with suitable markings to show to the user the kind of toast being produced with various settings of the parts. In this connection it will be seen that when the button stands at a position close to the shoulders the time interval which will be required for the arm 81 to rock clear over to the right hand limiting position will be a maximum for the condition of making "ordinary" toast, and by setting the button further to the right this time interval will be reduced. Since the time interval when making ordinary toast will control the darkness of such toast it follows that "dark" toast will be produced when the button is set close to the shoulders, "medium" toast will be produced when the button stands about midway of that portion of the slot to the right of the shoulders, and "light" toast will be produced when the button stands still further to the right. As long, however, as the button stands to the right of the shoulders "ordinary" toast will be produced. This result is attained by reason of the fact that when operating in this zone the switch 100 is in that position such that the resistor element 94 is short-circuited, and thus a maximum heating effect is produced by the heating elements.

Upon shifting the button to the left of the shoulders a lug 113 formed on the upper clip flange 110 will engage the toggle finger 101 of the switch 100, throwing said switch into its opposite position, and thus cutting in the resistor 94 into the circuit, so that the heating effect will be reduced to that amount which will not produce "ordinary" toast, but will dry out the slices as they are toated, thus producing "Melba" toast. The darkness of such toast will depend on how far to the left the button has been set in the "Melba" toast zone, but as long as the button remains in that zone the switch will remain in its thrown condition, so that the resistor will remain in the circuit, causing the heating elements to function at the desired low temperature for "Melba" toast production. When, however, the button is again shifted to the right of the shoulders the lug 113 of the clip will engage the toggle finger of the switch, this time on the left hand side of that finger, and as the button is moved past the shoulders the switch will be thrown back into the circuit closing position to cut out the resistor and ensure maximum temperature from the heating elements.

Whenever the arm 81 and button 102 are shifted to the left and released the spring element within the timer commences to move these parts uniformly towards the right, as already explained. Whenever the arm 81 is moved leftward of its extreme right hand position the contacts 86 and 87 are brought together to energize the heating elements. However, it is noted that after initial application of current to the heating elements there will be a time lapse before full toasting temperature of the heating elements and adjacent portions of the toaster is attained, and during this initial lapse of time the timer will be discharging its contained time count. Consequently the actual time interval of toasting will be less than the intended time interval, in the absence of special provision to correct this condition. I have made such special provision, as I shall now explain:

I have already mentioned the gear 83 which comprises a portion of the gear train of the timer or is geared to that train. During time count of the timer this gear rotates in the direction shown by the arrow in Figure 10. I have provided a bi-metal thermostat element 114 having its outer end secured to a pin 115 extending down from the top of the base section 20. The free end of this bi-metal element is formed with an engaging edge which will engage the teeth of the gear 83 as long as the bi-metal element is at a temperature below that which it will attain when the heating elements of the toaster have reached toasting temperature. When, however, the heating elements have attained toasting temperature this bi-metal element will flex outwardly to carry its free end away from the gear teeth and allow the gear to commence its rotations. Thereupon the timer will commence to count time in its normal manner. By this means the "dead" interval at the beginning of each toasting operation will be neutralized and the timer will in each case time the toasting operation to that exact time which has been intended.

In connection with the foregoing feature it is noted that this "dead" interval is substantially constant in amount regardless of the total time interval for which the timer is set. For this reason this "dead" interval is more troublesome when operating on short time intervals than when operating on longer time intervals. However, by actually preventing the commencement of time count until the toasting temperature has been attained it is evident that this "dead" interval will not affect the uniformity of the toasting operations. In order to further assist the functioning of the bi-metal element I have shown the ear 115 struck down from the top of the base section to a point close to the bi-metal element so that the heating effect within the housing where the toast carriers are located will be better transmitted to the bi-metal element.

I wish to point out the fact that when making "ordinary" toast whether "dark," "medium" or "light," the temperature function is high enough to toast the surfaces of the slices without drying out the interior portion of the slices, and the degree of darkness which will be produced is a function of time. Therefore in the making of "ordinary" toast the temperature function is constant at a high point, and the time function is changed according to the desired darkness of the surface toasting which is desired. On the other hand, when making "melba" toast the temperature is lowered to a point such that surface toasting of the slices is not effected prior to actual drying out substantially the entire thickness of the slices. Generally the time interval when making such "melba" toast will be substantially constant, since when the entire thickness of the slice has been substantially dried out the operation is completed. Therefore, when making such "melba" toast the temperature function is lowered and the time function is increased to a greater time interval than is used for making "ordinary" toast. However, in some cases it may be desired to provide for a time interval greater than that needed for the drying operation, and such increased time interval may be secured by the arrangements herein disclosed.

In order to catch and retain any crumbs which may fall down from the slices I have provided a tray 116 in the lower portion of the housing and supported on the top of the base section. This tray is of width such that it may be readily inserted into and removed from the housing through the opening in the front of the housing presently to be described. This tray is preferably provided with edge flanges of slight hight but sufficient to ensure that the trapped crumbs will not fall over the edge of the tray during removal from the toaster housing. If desired the front portion of the crumb tray may be provided with lateral projections 116$^a$ which extend out laterally beyond the side walls of the housing and these projections may be provided with styrene or similar heat resisting plastic knobs 116$^b$.

Any convenient form of housing may be provided for enclosing the portions of the toaster above the base section. In the form shown this housing 117, is shown as comprising a transparent inverted cup-like unit, closed over its top, and around its sides and back, and having its front wall provided with a wide opening 118 of width slightly greater than the width of the slices, and of hight to extend somewhat above the elevation of the top slice carrier. The lower edges of this housing may be provided with outwardly extending flanges 119, along the lower edges of the sides of this housing from front to back; and the base section is provided with upwardly and inwardly extending tongues 120 and 121 which provide, in conjunction with the top of the base section, grooves through and along which the flanges 119 may travel when the housing is being set into place. It is intended that this housing shall be slid into place from the back, the front opening of the housing being large enough to allow the upwardly extending frame to pass through such opening, and the tongues of the housing sides engaging with the flanges 119 during such movement. A clip 122 carried by the top of the base section may be provided for holding the housing in place after it has been thus moved to its final position on the base.

In Figures 14 and 15 I have shown a modified form of construction for rocking the shaft 51 for retracting the slice carriers into the working position, and setting the plate 53 into its latched position. In this case the shaft 51 extends up through an opening 123 in the top of the housing, which opening reaches to a recess 124 formed in the upper portion of the housing, said recess being provided with a front slotted opening 125 to pass the shaft when the housing is being slid into place on the base section. A finger piece 126 is secured to the upper end of the shaft after the housing has been thus set into place; and a guard plate 127 may be placed on the shaft and of form to cover over and close this slot when the parts have been completely assembled. This finger piece 126 may be pressed to one side in order to rock the shaft during the setting of the parts into their latched position.

In the so-far described constructions the "setting" of the rock shaft 51 and connected parts for retraction of the slice carriers to their inwardmost position, and the "setting" of the arm 81 leftwardly to its position against or limited by the button 82, are distinct and separate operations, which must be performed by separate manual operations. In case it should be desired to effect both of these operations by a single manual operation an interconnection between these parts may be provided. In this connection it is to be noted that the setting of the shaft to such inwardly moved position requires always that said shaft be rocked a given or specified angular rock, namely, that amount required to shift the carriers from their slice discharging position to their most inward position; or to express the matter differently, this operation requires that said shaft be rocked sufficiently to move the carriers from their outermost or slice delivery position to that position where the hook 67 will engage the end of the flange 63 on the plate 53. This movement is, however, a fixed amount of angular rock.

On the other hand, the "setting" of the arm 81 from its right-hand limit of movement (at which the timer operation previously performed was completed), to its position against the button 82 requires a variable amount of movement, depending on the position at which that button has been adjusted, according to the darkness of the toast which is desired. Consequently, this interconnection must be of such a nature as to take care of this fixed amount of movement for the one instrumentality, and a variable amount of movement for the other instrumentality. I shall now describe such a form of interconnection, for which purpose reference may be had to Figures 18, 19, 20, 21 and 22.

In Figure 18 the shaft 51, the timer housing 79, the lever arm 81, the button 82, and the arm 84—85 are shown, these being elements which have already been described in full detail. These several elements perform, in the present showing, the same functions which have been heretofore assigned to them. The front wall of the base section is also shown at 20 in this Figure 18. Slidably mounted to the bottom face of the top of the base section 20 there is the bar 128. Such sliding mount may be effected, for example, by two pins or studs 129 and 130 extending down from the top of the base section, and passing through corresponding slots 131 and 132, these slots being of sufficient length to permit that amount of reciprocating movement of the plate or bar 128 required to perform the functions assigned to that plate. Furthermore, this pin and slot support for this plate or bar is such that said bar may be raised during its movement leftward an amount to permit the disengaging operation presently to be explained. For this purpose also, this bar is normally supported a distance below the bottom face of the top of the base section sufficient to permit the rising movement of the bar required for such disengaging function, as will presently appear.

I provide a rock shaft 133 extending through the side wall of the base section, and capable of effecting a rock of about 90 degrees from one extreme to the other extreme. To the outer end of this rock shaft there is secured the finger piece 134 which may be readily manipulated by the operator to rock the shaft through its complete rock of, say, 90 degrees. The inner end of this rock shaft carries the short crank arm 135. The inner or left hand end of the bar 128 is provided with a down turned ear 136, spaced away from the position of the crank arm 135 even when the rock shaft 133 is rocked to its full clockwise position, and when the bar 128 is at its extreme left hand position. A rather loose link 137 extends through the ear 136 and the crank arm 135, said link being provided with enlarged heads but the openings in the ear and crank arm being sufficiently free to permit that amount of rock of the crank arm needed from one extreme to the other without causing any binding of the ends of the link with either the ear or the crank arm. It will be seen that this arrangement is such that when the crank arm is rocked fully in its counterclockwise direction by manipulation of the finger piece 134, the bar 128 will be drawn to a full limit of left hand movement, irrespective of what movement of the arm 81 may be required.

There is a bell-crank 138 pivoted to the bottom face of the top of the base section at the point 139. One arm of this bell-crank, 140, overlies the bar 128 and is provided with a slot 141 which is engaged by a pin 142 carried by the bar 128. The length of this slot is sufficient to allow for full back and forth movement of the bar 128. To the rock shaft 51 there is connected an arm or bar 143, such connection in the form shown being effected through the medium of a plate 144 connected to the rock shaft and to which plate said arm 143 is also connected. In the arrangement of Figure 18 the spring 59 is shown as being connected to this plate 144, or this plate 144 may be the plate 53 already described. A pin 145 depends from the other arm 146 of the bell-crank and rides to the left hand side of the bar 143, that is, below said bar when viewed as in Figure 18. With this arrangement it is evident that upon drawing the bar 128 to the left its full amount the rock shaft 51 will be rocked counter-clockwise its full amount to thereby perform the various functions assigned to that shaft and connected parts as previously described herein. It will also be evident that, due to the manner of engagement of the pin 145 with the bar 143 it is possible for the bar 128 to return to its full right hand position leaving the rock shaft in its fully rocked position counterclockwise, and with the hook 67 engaged with the shoulder 64 already described.

From the right-hand portion of the bar 128 there depends a trigger element 147 (see Figures 19, 21 and 22). This trigger element may be of any suitable form for the functions which will now be explained, but the construction shown is well adapted to meet the requirements. This trigger includes a plate which depends through a slot formed in the end portion of the bar 128, the upper end of the plate being provided with side projections 149 and 148 which will prevent the plate from falling through the bar, but will permit the plate to be raised for the unlatching operation presently to be described. A light leaf spring 150, having its left hand end secured to a stud 151 on the bar 128, and its right-hand portion overlying the upper end of the plate 147, serves to ensure proper downward return of that plate when released by the tripping cam presently to be described.

The lower portion of this plate includes a finger 152 which extends to a position below or lower than the arm 81, said finger lying to the right of that arm 81, as shown in Figure 18. This lower portion of the plate also includes a cut-away portion 153 which may engage a tripping cam at the proper time. The end portion of the bar 128 is provided with an upwardly struck ear 154 in position to prevent counterclockwise rock of the plate 147 during the leftward movement of the bar 128, but allows the plate to rock slightly clockwise if needed. The button 82 and/or the pin 107 already referred to carries a cam 155 which will stand substantially horizontal during back and forth reciprocations of the button. Back and forth movements of the button 82 will carry with it the cam 155 to corresponding positions. The pin 107 and connected parts, including the button 82 and cam 155 may travel horizontally in a slot formed in the flange of the base section, and sufficient friction may be provided to retain these parts in set position, according to such an arrangement as that already described, including the friction disk.

It will be understood that with this sliding button arrangement, the fully right-hand moved position is the position for minimum time interval operation of the timer; and that by moving this button more and more to the left the time interval of operation of the timer will be correspondingly increased. This will be understood from the following further explanation:

The cut-away portion 153 of the plate 147 rides over the cam during the leftward movement of the bar 128. During the first portion of this leftward travel said cut-away portion 153 rides clear of the cam, the plate depending its full extent as limited by the ears or projections 148 and 149. After a sufficient amount of such leftward movement the cut-away portion will ride onto the cam 155, and the leftward position of the bar 128 at which such engagement of the plate 147 with the cam will occur will depend on the "set" position of the button 82 and the cam 155. When such riding of the plate on the cam commences it is evident that further leftward movement of the bar 128 will cause the plate 147 to rise against the force of the spring 151. The first portion of the leftward movement of the bar 128 causes the finger 152 to press against the arm 81 of the timer, thus drawing said arm leftward as long as such engagement continues; but when, finally the effect of the cam 155 serves to raise the plate 147 sufficiently said finger 152 will disengage from the arm 81 and further leftward movement of the bar 128 to its final limit (that at which the rock shaft 51 and connected parts have been cocked by the hook 67) will take place without any corresponding further rock of the timer arm 81. Accordingly, the setting of the timer arm 81 will be determined by the "set" position of the button and the cam, while the bar 128 makes its full amount of leftward travel.

Evidently, when the parts have thus been set to their respective positions by a full rock of the button 134 said button or fingerpiece may then be immediately returned to its original or initial position. This may be done, either by carrying with it the bar 128, or by leaving said bar for the time being locked in its leftward position. The former operation may be performed since the rightward movement of the bar 128 will merely carry the bell-crank arm 146 counterclockwise, leaving the arm 143 in its cocked position (the rock shaft being cocked also); and such rightward movement of the bar 128 may carry the plate 147 with it and past the arm 81 of the timer, leaving said timer arm to return slowly to its right hand position. This latter operation is possible, since the rightward movement of the bar 128 and plate 147 will cause said plate to swing clockwise over the timer arm 81.

In some cases, however, it may be desirable to lock the bar 128 and connected parts in their full leftward position after they have been moved to that position, and thereafter releasing these parts when the timer arm 81 has completed its full rightward movement. In such case I may provide a trigger or latch 156, carried by a bracket 157 extending down from the top of the base section 20; and by providing a notch 158 in the edge of the bar 128 adjacent to said latch, the latch may engage such notch and retain the bar in its full leftward moved position. The insulating roller 88 carried by the arm 84—85 of the timer, or said arm 84—85 is adapted to engage this latch when the arm 84—85 is released and swings clockwise, which action takes place at the completion of the time count of the timer. Therefore, at the completion of the time count this latch will disengage from the notch 158 of the bar 128, into which notch that latch had been drawn by a light spring 159, thus allowing the bar 128 and connected parts to return to their initial positions at completion of the time count by the timer.

A spring 160 may be provided for drawing the bar 128 to the right when it is released, or the spring 59 may be depended on to perform this function.

It is noted that by proper design of the cam element 155 with respect to the longitudinal movement of the bar 128, it is possible to provide for such fully interconnected scheme of operation over the entire range of positions of the button 82. That is, it is possible to provide for such interconnection to include the "melba" toast range as well as the "ordinary" toast range. This is true because the timer arm 81 swings from left to right, with its zero or fully discharged position at the right-hand limit of its rocking movement. When making "melba" toast this arm is swung further to the left (in its "setting") than the extreme leftward swing of this arm when setting for the darkest kind of "ordinary" toast, and for the lightest "melba" toast the arm is "set" to a position leftwardly of its "setting" for the darkest "ordinary" toast. In other words, as the arm 81 is "set" further and further leftward the resulting toast which will be produced is darker and darker "ordinary" toast, then changeover to "melba" toast of the lightest form, and still further leftward "settings" of the arm 81 correspond to darker and darker "melba" toast production. The foregoing statements are true for similar settings of the button 82. The foregoing statements are also true for the herein disclosed arrangements either with or without the interconnection disclosed in Figures 18, 19, 20, 21 and 22.

While I have herein shown and described only certain embodiments of my present invention, still I do not intend to limit myself to the same, except as I may do so in the claims to follow.

I claim:

1. In a toaster for production of either regular toast or melba toast, a circuit including a main toaster heating element, a spring operated timer, main switch means in said circuit, said timer including a movable element manually movable in one direction to wind said timer and being spring movable in the other direction during time count discharge of the timer to a zero position, manually adjustable means to limit movement of said movable element of the timer in the timer winding direction, means to move said main switch means to circuit closing position when the timer movable element is moved from said zero position and to open said main switch when the timer movable element is in its zero position, a resistor, connections to place said resistor in series connection with said circuit to increase the resistance of said circuit, together with second switch means, connections to bridge said second switch means across said resistor when said second switch means is closed, means to move said second switch means to its open position when said manually adjustable movement limiting means is more than a predetermined distance from the zero position and to move said second switch means to its closed position when said manually adjustable movement limiting means is less than said predetermined distance from the zero position, whereby when the manually adjustable means is more than said predetermined distance from the zero position said resistor is included in circuit with the main toaster heating element to reduce current and heating effect for production of melba toast, and whereby when the manually adjustable means is less than said predetermined distance from the zero position said resistor is excluded from circuit with the main toaster heating element to not reduce current and heating effect of the main heating element for production of regular toast.

2. A toaster as defined in claim 1, wherein said manually adjustable means is adjustable to positions substantially farther from said zero position than said predetermined distance, whereby the duration of timer operation with the resistor in circuit may be adjusted to thereby produce varying qualities of melba toast.

3. A toaster as defined in claim 1, together with an enclosure for toasting slices and said main toaster heating element, said enclosure including an opening for introduction and removal of slices into and from toasting position, and said opening being continuously open during toasting operations and of non-variable size.

RUDOLPH R. MUELLER.

REFERENCES CITED

The following references are of record in the file of this patent:

UNITED STATES PATENTS

| Number | Name | Date |
| --- | --- | --- |
| 1,694,762 | Ackerman | Dec. 11, 1928 |
| 1,862,965 | Maragos | June 14, 1932 |
| 1,903,089 | Browning | Mar. 28, 1933 |
| 1,946,886 | Schramm | Feb. 13, 1934 |
| 2,036,523 | Freeman | Apr. 7, 1936 |
| 2,112,422 | McCullough | Mar. 29, 1938 |
| 2,129,360 | Purpura | Sept. 6, 1938 |
| 2,229,945 | Uhlrig | Jan. 28, 1941 |
| 2,236,405 | Ireland | Mar. 25, 1941 |
| 2,257,906 | Gough | Oct. 7, 1941 |
| 2,266,014 | Erickson | Dec. 16, 1941 |
| 2,288,748 | Scharf | July 7, 1942 |
| 2,309,641 | Gough | Feb. 2, 1943 |
| 2,337,124 | Olving | Dec. 21, 1943 |
| 2,339,183 | Myers | Jan. 11, 1944 |
| 2,357,288 | Ricard | Sept. 5, 1944 |
| 2,389,927 | Parr | Nov. 27, 1945 |
| 2,414,325 | Newell | Jan. 14, 1947 |
| 2,429,736 | Wales | Oct. 28, 1947 |